350-167.
XR  3,950,769  SR

United States Patent [19]
Yevick

[11] 3,950,769
[45] Apr. 13, 1976

[54] COMPACT CAMERA AND VIEWER APPARATUS

[75] Inventor: George Johannus Yevick, Leonia, N.J.

[73] Assignee: Personal Communications, Inc., Stamford, Conn.

[22] Filed: Oct. 16, 1974

[21] Appl. No.: 515,343

[52] U.S. Cl.................................. 354/115; 354/120
[51] Int. Cl.².......................................... G03B 35/08
[58] Field of Search ........... 354/105, 112, 114, 115; 350/144; 353/10; 354/120

[56] References Cited
UNITED STATES PATENTS

| | | | |
|---|---|---|---|
| 2,185,508 | 1/1940 | Kunze | 354/105 |
| 2,833,176 | 5/1958 | Ossoinak | 354/115 |
| 3,225,672 | 12/1965 | Clay | 354/112 |
| 3,291,555 | 12/1966 | Browning | 354/115 |
| 3,387,547 | 6/1968 | Houghton | 354/125 |
| 3,503,315 | 3/1970 | Montebello | 354/112 |
| 3,535,993 | 10/1970 | Jones | 354/112 |
| 3,611,899 | 10/1971 | Ataka | 354/114 |

Primary Examiner—L. T. Hix
Assistant Examiner—James LaBarre
Attorney, Agent, or Firm—Thomas J. Greer, Jr.

[57] ABSTRACT

An apparatus for use as both a camera and a viewer. As a camera, light from an object is broken up by a planar array of N lenses into N identical images which fall onto an opaque mask. A small aperture lies within each image, but at a different relative zone so that the apertures are non-homologous with respect to the image. Light passing through the apertures strikes virgin photographic emulsion of a lensfiche. The lensfiche is indexed and the process repeated for the next object. After emulsion development, the lensfiche is sequentially illuminated from the rear and each object (macroscene) sequentially reconstructed by projection on a viewing screen. For one embodiment, the method of recording consists of forming N identical and non-overlapping images, taking one portion from each of the N images, the N portions being non-homologous and dispersed from each other, and photographically recording N non-homologous portions. For readout, the N portions are projected and magnified on a screen to reconstitute the original object, the N portions now coalesced to form a coherent, non-dispersed image.

8 Claims, 18 Drawing Figures

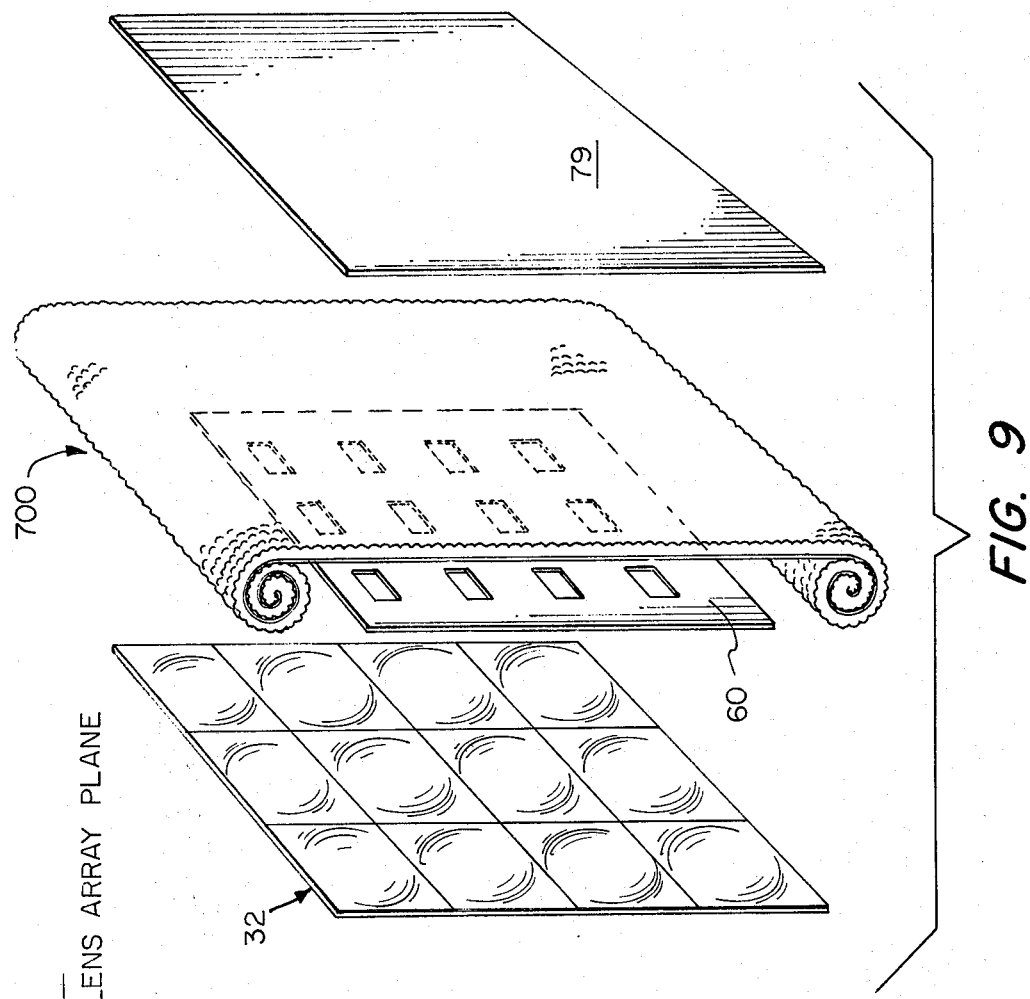
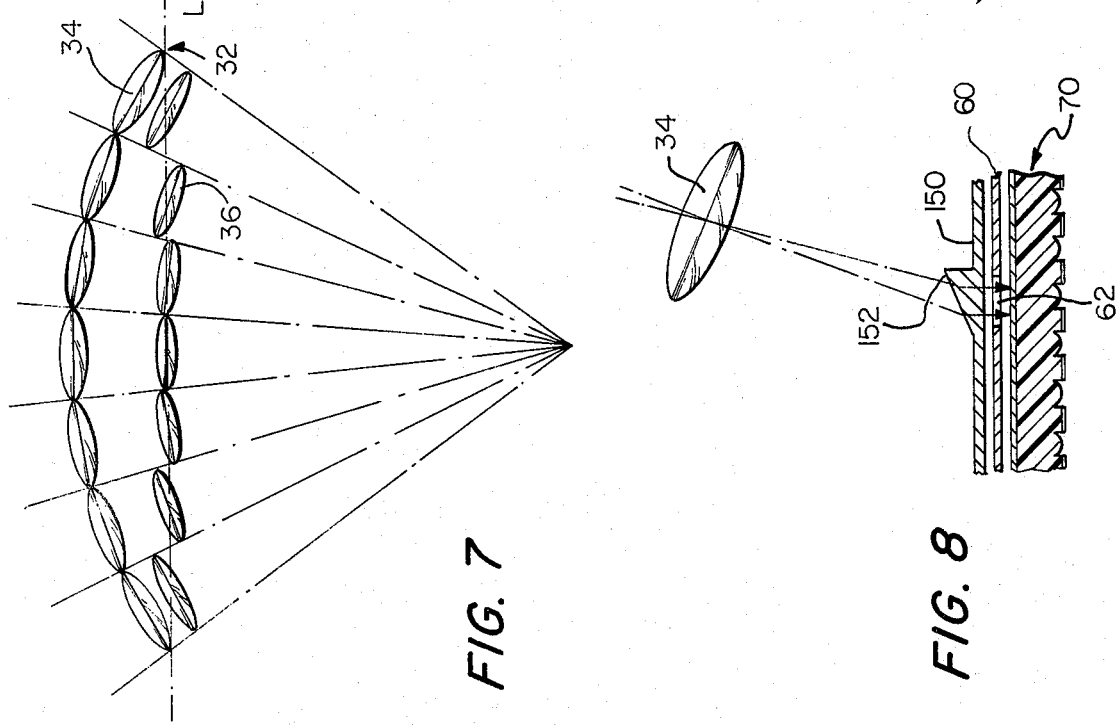
FIG. 7
FIG. 8
FIG. 9

$d' = kb$ WHERE k IS AN INTEGER

COMPACT CAMERA AND VIEWER APPARATUS

This invention relates to a microfiche apparatus exhibiting utility both as a recording device (a camera) and as a readout device (a projector). This invention employs an optical recording and readout element described in my co-pending U.S. Pat. application Ser. No. 309,968, filed Nov. 28, 1972, now U.S. Pat. No. 3,864,034, entitled "Microfiche and Reader," hereby incorporated by reference. In that application, I disclose a microfiche having integral lenses, termed lensettes because of their small size. I have termed such a combination a lensfiche. This denotes the combination of a plurality of small lenses on one side of a transparent plate and a photographic emulsion applied on the other side of the plate. While entirely operable in the manner disclosed, the apparatus of that application suffers the disadvantage of not being able to serve as a camera except for recording information which is at a fixed object distance from the lensettes, such as a sheet of transparent master film containing intelligence placed flat upon a transparent screen.

According to the present invention, a combined, compact large area camera and viewing device is disclosed wherein the camera function is utilized for the taking of pictures at various distances, as in the manner of any conventional camera. For the projection or readout phase, the device is used in a manner similar to that disclosed in my said co-pending application. Thus, for a film having an area approximately 3 in. × 4 in., the lensfiche can accommodate, for example, 100 distinct photographs.

The present invention employs as its objective lens a lens array consisting of, for example, 500 lenses arranged as in the manner of a mosaic, with each lens having its own aperture stop and, effectively, its own shutter. The lenses of the array may be formed of plastic or other inexpensive material and may be molded into a single sheet. By the use of such materials, mass production techniques may be employed to lower the cost of fabrication.

In general, the essence of the camera operation of this invention consists in forming N identical or nearly identical non-overlapping images of an object. There is one image formed for each lens of the lens mosaic or array. A small portion, synonymously, a sub-image, is selected from each of the N images thus formed. Each small portion is non-homologous with respect to the images and thus represents a unique portion of the whole image. Each sub-image may thus be regarded as similar to a (different) piece of a jig-saw puzzle. However, they do not touch each other; they are dispersed. These non-homologous portions are then allowed to fall on the photographic emulsion of a lensfiche such as described in my said co-pending application. Thereafter, the lensfiche is photographically fixed or developed and readout may be effected by projection and magnification, in a manner shown, for example, in said co-pending application. When projected, the sub-portions are magnified so that they now touch each other and coalesce to form a coherent image.

IN THE DRAWINGS

FIGS. 6 and 7 illustrate a modification of the lens array of FIG. 1 when wide-angle capability is desired.

FIG. 8 is a partial cross-section illustrating a modification to reduce projection distortion for tilted lenses.

FIG. 9 schematically designates the invention as applied to the taking of motion pictures.

Figure 10:
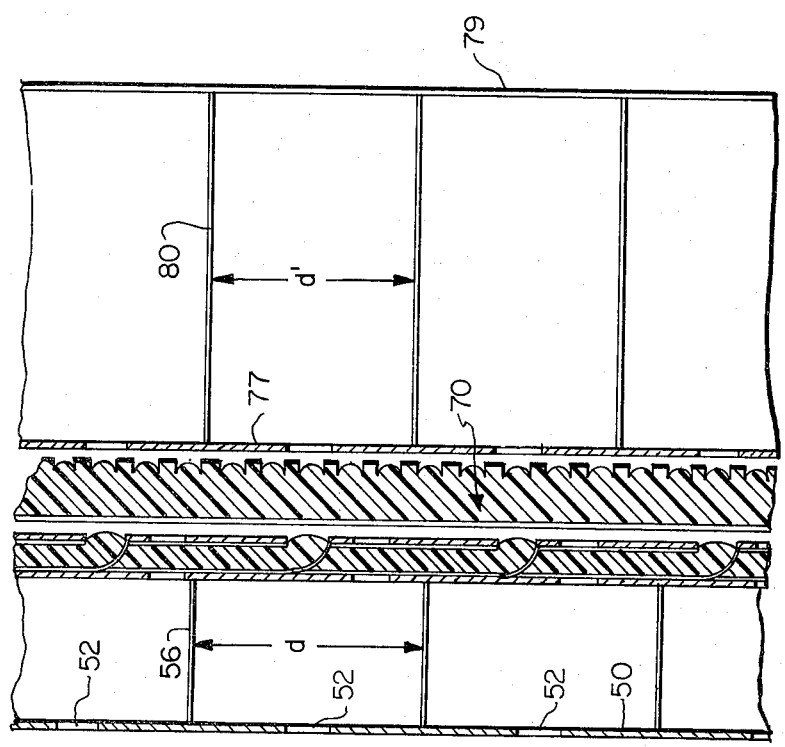

FIG. 10 illustrates a modification wherein readout is effected by illumination by a sheet which includes light pipes.

Figure 12:
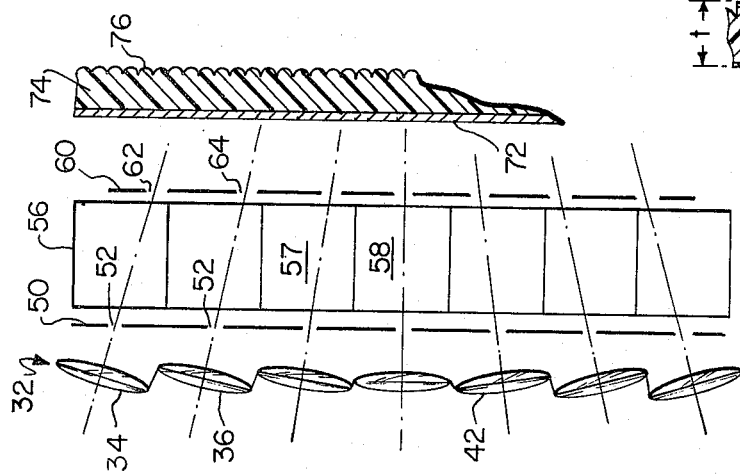
Figure 11:
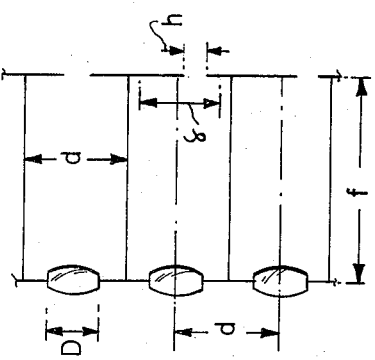

FIGS. 11 and 12 illustrate several parameters which appear in equations in the written description.

Figure 1:
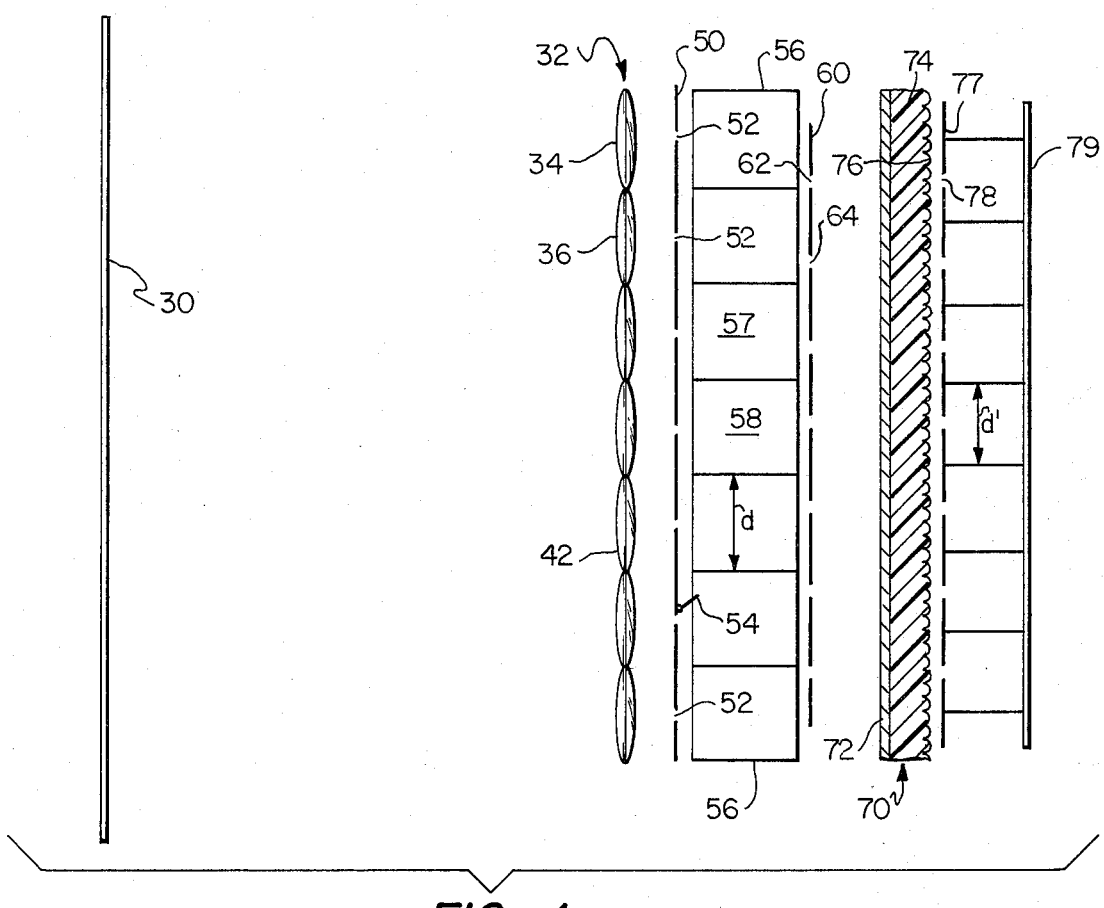
FIG. 1 is a partially schematic side-elevational view illustrating the apparatus of this invention as a camera.
Figure 12B:
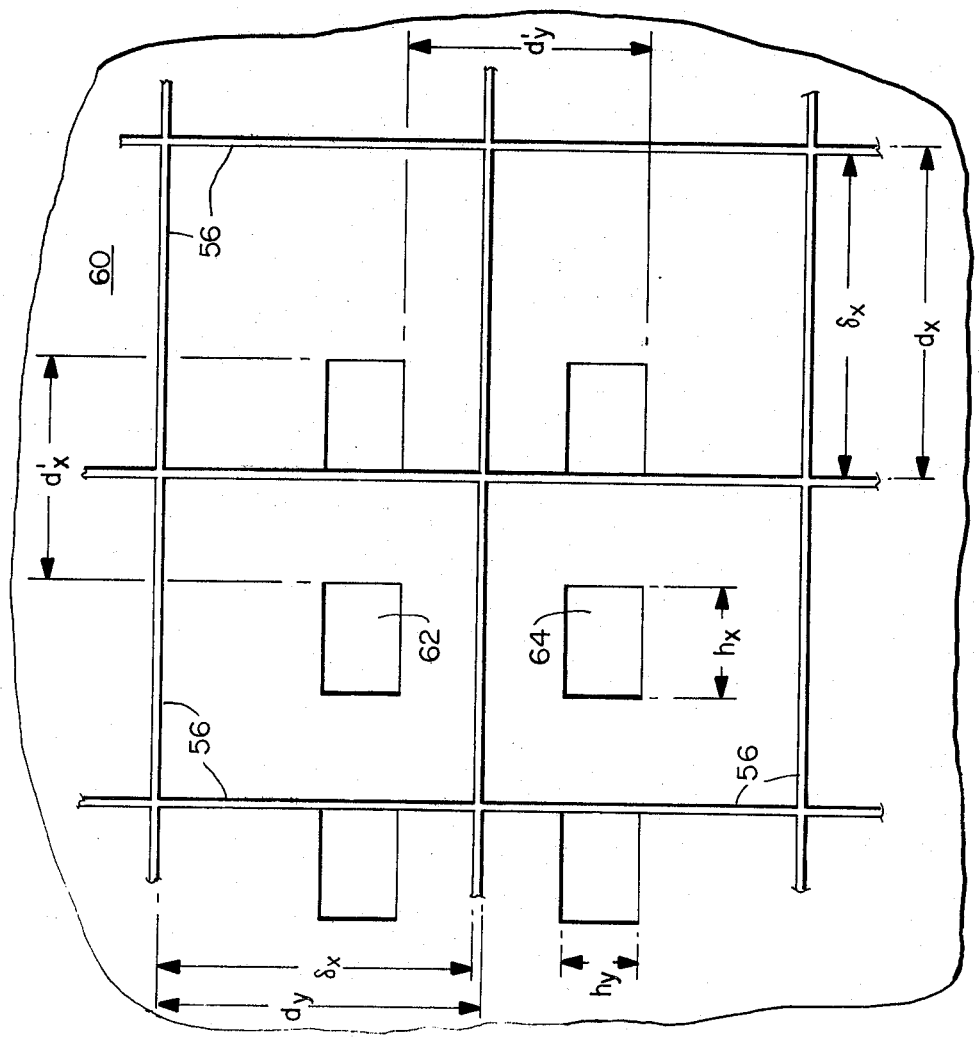

FIG. 12b is a partial plan view of mask 60 of FIG. 1 and illustrates certain parameters.

Figure 13:
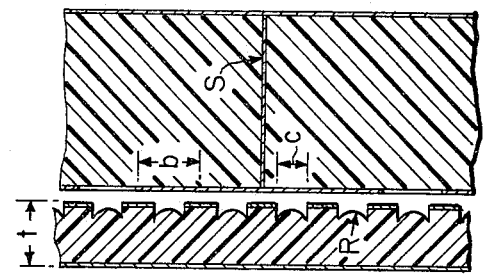

FIG. 13 is a view similar to FIG. 1 and illustrates an embodiment.

Figure 14:
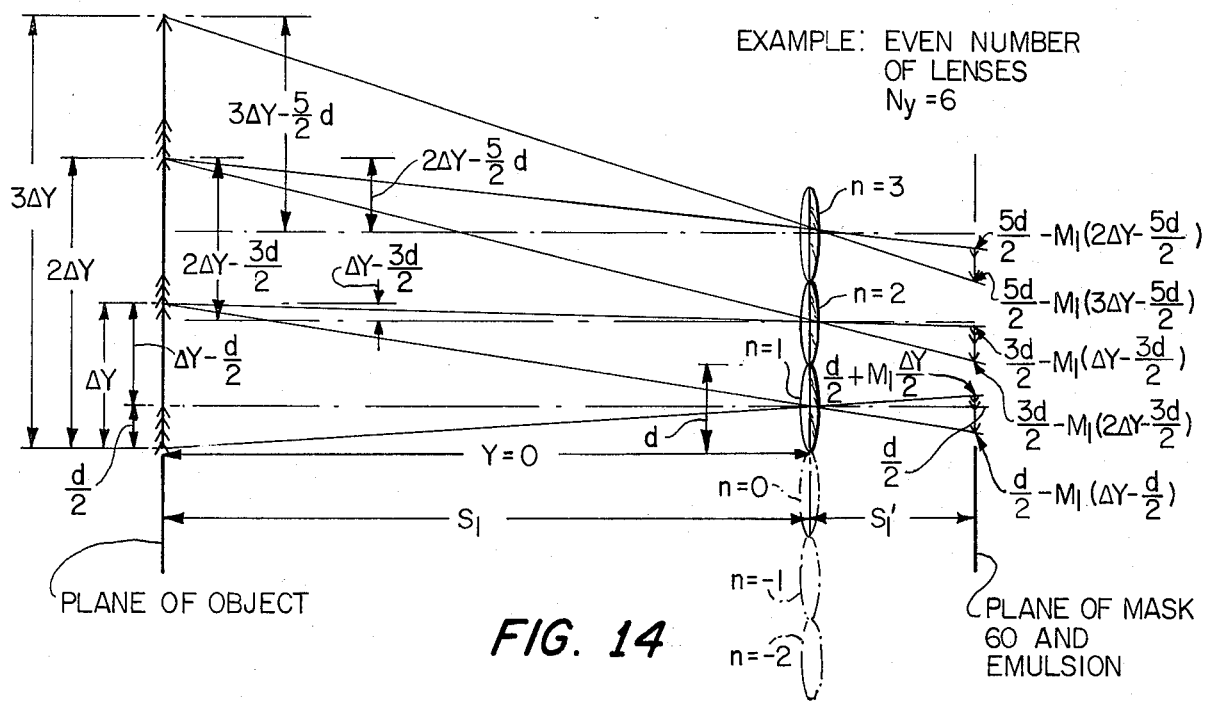
Figure 15:
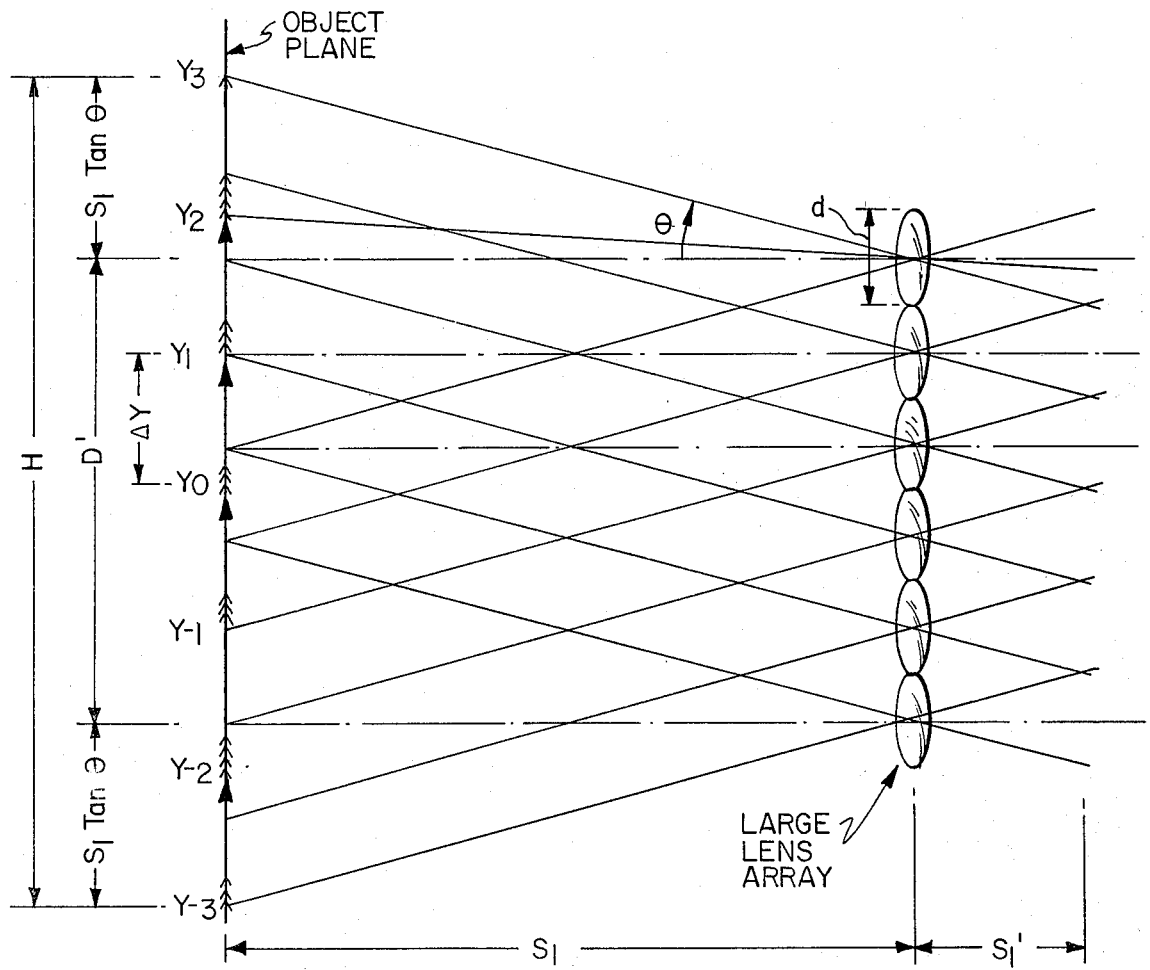

FIGS. 14 and 15 illustrate how the positions of the openings of mask 60 of the embodiment of FIG. 1 are determined, and certain other relations.

Figure 16:
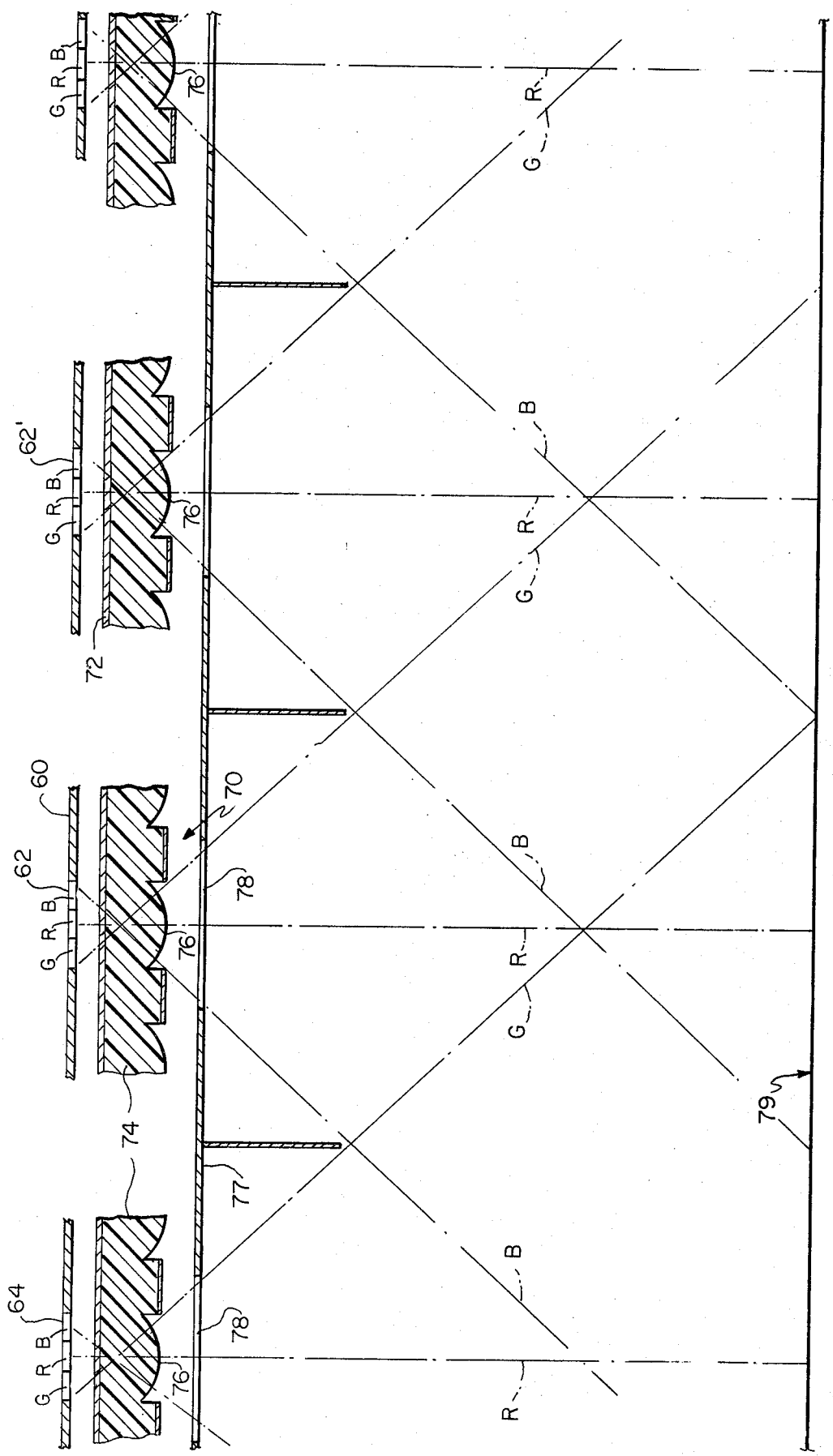

FIG. 16 illustrates an embodiment wherein color photographs are obtained by the use of black and white photographic emulsion on the lensfiche.

Figure 17:
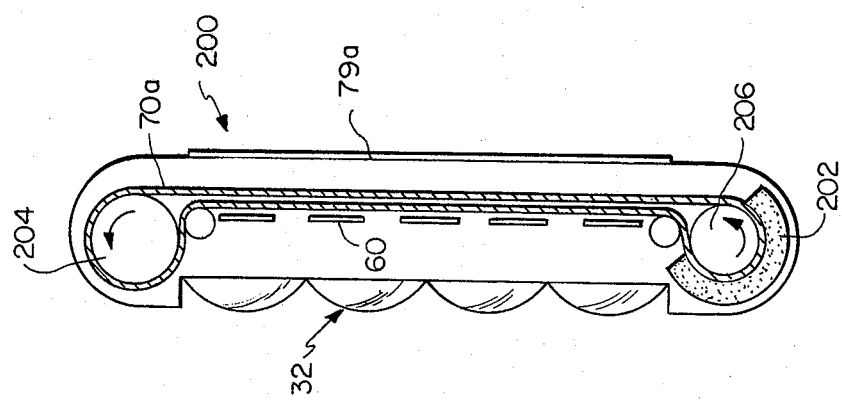

FIG. 17 is a partially schematic cross-section of an embodiment for use as a motion picture camera and projector.

Figure 2:
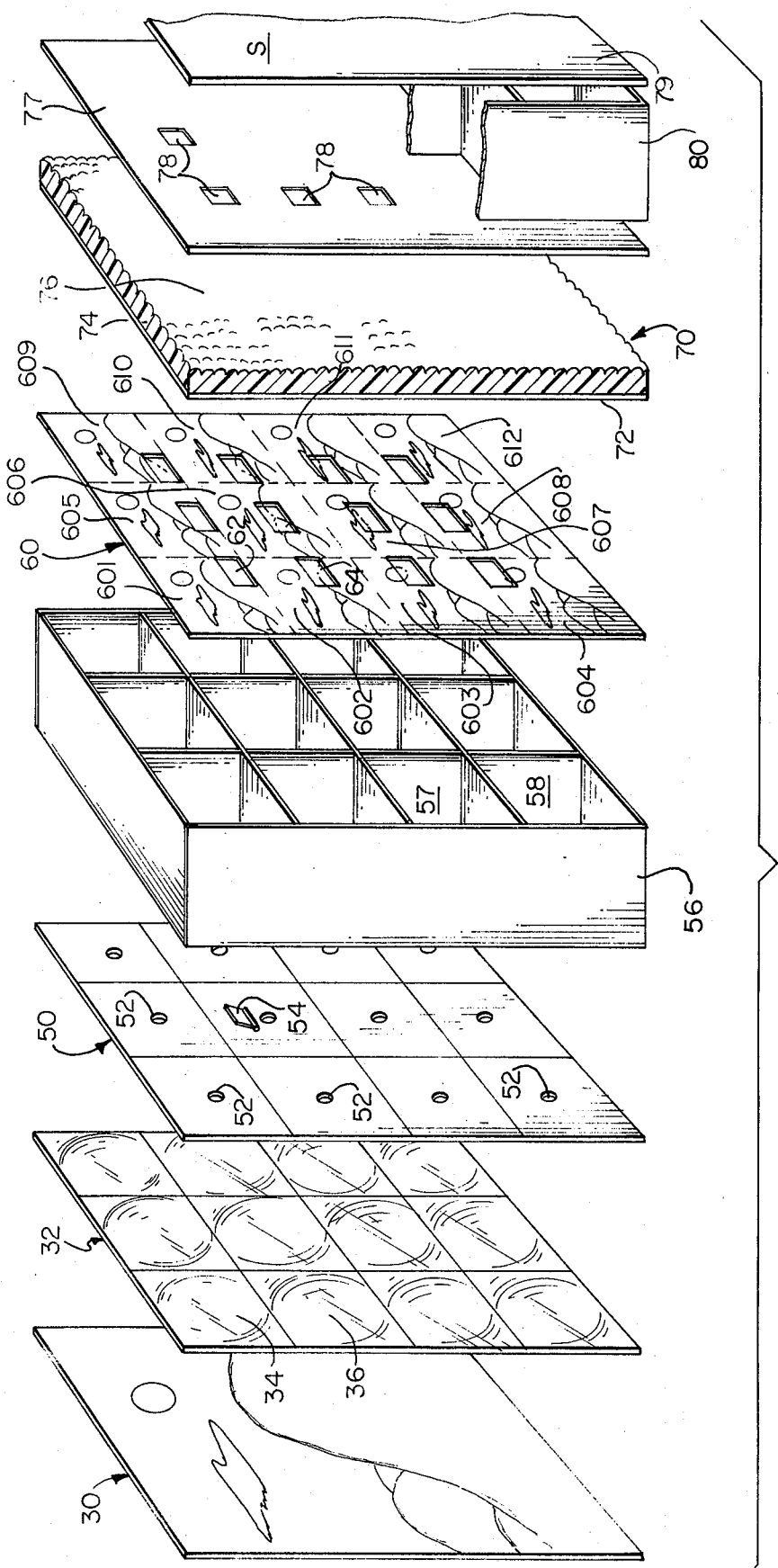
FIG. 2 is a partially schematic perspective view similar to FIG. 1.

Referring now to FIGS. 1 and 2 of the drawings, the numeral 30 denotes an object. The object may be a landscape at an appreciable distance from the camera or it may be an object relatively close to the camera. In FIG. 2, the object is depicted as a landscape having the outline of several mountains, the moon, and a cloud in the sky. Referring now to FIG. 1, light from the object passes into each lens 34, 36 —, 42—, of lens plate 32. The lens plate 32 is substantially a two-dimensional article and may be formed, for example, of a clear plastic such as methyl methacrylate. The individual lenses 34, 36, etc., may, however, be formed of any convenient material positioned in a suitable grille. Immediately behind lens plate 32 an opaque plate 50 is positioned and is provided with a plurality of apertures 52. Each aperture 52 corresponds to a single lens of the lens mosaic with each opening 52 functioning as an aperture stop. The numeral 54 schematically designates a shutter, there being a shutter for each aperture 52, with the shutters acting in synchronism. Thus, when shutter 54 is actuated to allow light to pass through its corresponding opening 52, each of the other shutters is correspondingly actuated to allow light to pass through the remaining openings 52. The numeral 56 denotes opaque, intersecting septa or walls preferably coated on each side with carbon black or other light-absorbing substance. The walls 56 form squares, with three-dimensional cells 57, 58, being defined by each square. There is one cell 57, 58, etc. for each aperture 52 and for each lens 34, 36, etc. The septa function, in their intersection with scene mask 60, to prevent optical cross-talk between adjacent zones of the mask.

The numeral 60 denotes an opaque mask or plate having a plurality of apertures 62, 64, etc. The numerals 601, — 612 denote rectangular zones of the same size in plate 60. Each of these zones corresponds to a single aperture 52 and to a single lens 34, 36, etc. For purposes of illustration, only 12 zones and 12 lenses are depicted. In practice, there can be hundreds in a typical construction.

As indicated at FIG. 2, each zone 601–612 receives an identical, complete image of object 30. The images are shown erect, but would in practice be inverted. The apertures 62, 64, etc., function as field stops and are non-homologous with respect to each of the identical images. That is to say, they occupy different positions relative to the zones 601, 602, etc., in which they lie or are positioned. Their combined area is at the most equal to the area of any one of the zones 601–612 of plate 60 if no redundancy of intelligence prevails. It will be noted that without the septa 56, multiple overlapping of images on the zones 601, 602, etc., would occur.

Referring again to FIG. 1 of the drawings, light passing through the apertures 62, 64 is now permitted to fall on emulsion 72 of lensfiche 70. As set out in my noted co-pending application Ser. No. 309,968, the lensfiche is defined by emulsion 72 supported on one side of the transparent plastic, glass, or other suitable material 74 which has on its other surface a plurality of integral convex lensettes 76 having opaque inter-lensette portions. The numeral 77 denotes a selector mask having openings 78. (This selector mask corresponds to mask 16 and apertures 17 of my said co-pending application). Septa 80, similar to septa 56, extend between selector mask 77 and screen 79. The center of each cell defined by screen 79, mask 77, and the walls of 80 coincides with the center of each opening 62, 64. It will be understood the the lensfiche 70 may be formed in a manner identical to that set forth in my said co-pending application.

The manner of taking a single scene will be obvious. For the next exposure, the shutter 54 is closed, the lensfiche 70 indexed one unit (four mils, for example) relative to mask 60 so as to align a fresh or virgin set of emulsion areas with the apertures 62, 64, etc., to take a second scene. Mask 77 remains fixed. The shutter mechanism 54 is now actuated, i.e., a photograph is taken. Successive indexing and shutter operation continues, at the desire of the operator, until all of the distributed sets of emulsion areas, each set corresponding to a single scene, are exhausted. For readout or projection, the lensfiche is removed from the apparatus, the photographic emulsion reverse-developed and fixed to thereby assure a positive image on projection, and the lensfiche now illuminated from the rear and readout in any convenient manner such as shown by my noted co-pending application. The microimages on the lensfiche emulsion corresponding to the dispersed image sub-portions passing through aperture 62, 64, etc., during recording are projected and magnified during readout. The result is a congruent, positive image on the viewing screen.

The relation between each objective lens 34, 36, etc., of lens mosaic 32, openings 62, 64, etc. of mask 60, and the lensettes 76 of lensfiche 70 is such that each objective lens corresponds to both a single opening 62 and the emulsion associated with a single lensette 76. Thus, the openings 62, 64, etc. are no larger than the interlensette spacing of lensfiche 70.

The use of black and white emulsion on the lensfiche to record color is shown and described in my co-pending application Ser. No. 474,790, filed May 30, 1974, entitled, "Multiple Function Microfiche and Film Recording and Viewing System" herein incorporated by reference. That technique may be employed in connection with this invention.

For the purpose of controlling the amount of illumination and degree of resolution in recording, the f-number of the lens array can be varied. This is done by moving the mask 50 carrying apertures 52 towards and away from the lens array.

The shutter mechanism has been schematically indicated by the numeral 54. In practice, the shutter may be formed as in the manner of a conventional focal plane shutter. Two apertured opaque sheets in such a shutter each contain N openings, corresponding to the N aperture stops 52. The two sheets are varied relative to each other, in a known manner, to vary the exposure times. The focal plane shutter is positioned just to the right of mask 50 in FIGS. 1 and 2. The shutter operation is well-known and hence is not illustrated or further described.

The above description has treated of the case when the object 30 is at such a distance from the camera apparatus that the light rays entering the lens array 32 may be considered nearly parallel. That is to say, the light coming from the object may be considered the same as light coming from a star wherein the rays are parallel because of the great distance. As a consequence of the fact that the light rays are nearly parallel for relatively large object distances from the camera, it necessarily follows that all of the lenses having the same optical properties, then each of the images formed on plate 60 will be identical. If, however, the object is relatively close to the camera apparatus, then the light rays entering the various lenses of the array will not be parallel. The consequence is that the lenses will form or define sharp images on plate 60 only if plate 60 is varied relative to the array, such as to move closer to or further away from the array. Furthermore, as a consequence of an object positioned relatively close to the lens array, the images in zones 601–612 on plate 60 will not be identical. The cause is that septa 56, in combination with their associated lenses and aperture stops, define an entrance cone of light for each lens. In the case of an object at infinity, so to speak, the entrance cones of the lenses are all the same. But with a relatively close object, some portions of the object will lie outside of the entrance cones for some of the lenses of the array. Accordingly, the images for different zones 601, 602, etc., will be generally different for relatively close objects.

In order to accommodate relatively close objects, I have determined that not only must the lens array 32 be moved relative to the emulsion 72 and plate 60, but the non-homologous openings 62, 64, etc., must also be varied relative to their position as indicated in FIG. 2 of the drawings. One mechanism for accomplishing simultaneous adjustment of the lens array 32 with respect to the emulsion 72 and variation of the non-homologous openings 62, 64, etc., relative to themselves, is shown at FIGS. 3–5 of the drawings.

Figure 3:
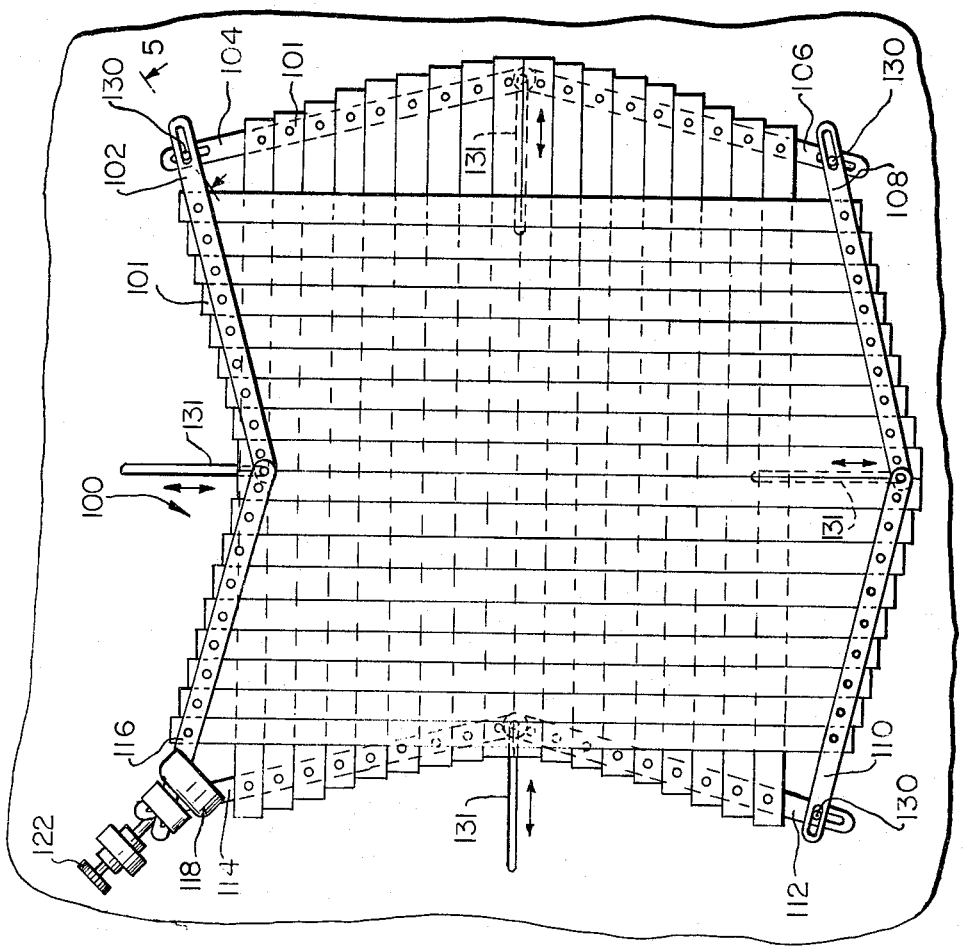
FIG. 3 is a plan view of a variable-aperture and lens moving apparatus.

Referring now to FIG. 3 of the drawings, the numeral 100 denotes generally a variable, non-homologous aperture-generating device and corresponds to element 60 of FIG. 2 of the drawings. The device is composed of crossed-slat members 101 which are pivotally connected at their ends to eight links 102, 104, 106, 108, 110, 112, 114, 116. At one of the four corners of the array 100, an adjustment mechanism is positioned and includes nut 118 having a pair of pins 119 which extend through indicated slots near the ends of links 106 and 108. A collar 120 is fixed to the frame of the camera apparatus and carries rotatable bolt 122 provided with an enlargement for turning by hand one of its ends. Nut 118 is movable on bolt 122 by rotation of 122, the bolt being prevented from moving axially by the indicated abutments. This is shown most clearly at FIG. 4 of the drawings. Fixed pins 130 are anchored to the frame of the camera apparatus by collar 121, the pin extending through both slots of the ends of links 106 and 108. For the driving mechanism, pin 130 may be anchored to member 121, in turn fixed to the frame. The pins coupling the inner ends of the eight links are constrained to move only within their respective grooves 131 in the frame.

Figure 5:
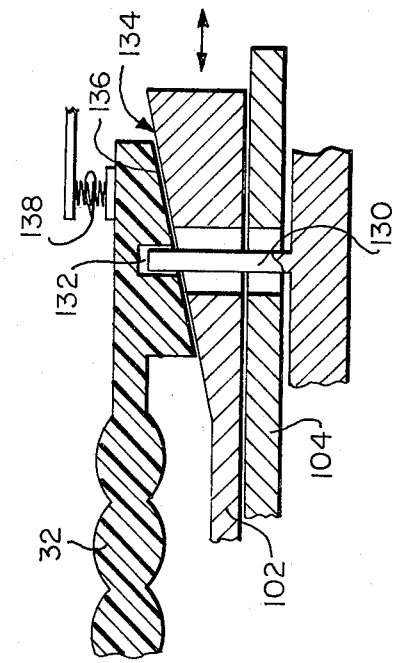
FIG. 5 is a view taken along section 5—5 of FIG. 3, with a portion of a lens mosaic plate added.

Referring now to FIG. 5 of the drawings, the numeral 130 also denotes any one of three other fixed pins mounted on the frame of the camera apparatus and which extend through the indicated slots at the outer ends of the other links. The four stationary pins 130 are at the corners of a square. Numeral 132 denotes a recess in a thickened enlargement around the periphery of lens plate 32. One end of one of the upper links at each corner, link 102 for example, is provided with an inclined portion 134 which cooperates with corresponding inclined portion 136 of lens plate 132.

Figure 4:
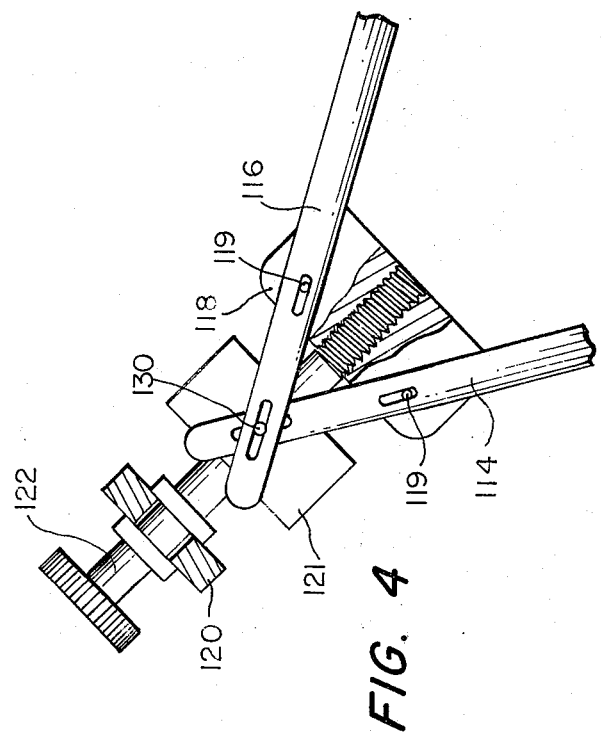
FIG. 4 is a cross-sectional plan view of a portion of FIG. 3.

The mode of operation of the mechanism indicated at FIGS. 3, 4, 5 is as follows: When the user of the camera apparatus wishes to photograph an object relatively close to the lens array 32, the screw 122 is rotated to thereby pull links 106 and 108 downwardly and to the right. This results in movement of the eight links in such a manner as to make the outline of the links approximately a square, as opposed to the indicated configuration. Each link moves towards its associated pin 130. With such movement, the slats 101 move to define openings between them. This follows from the fact that the vertically running slats, disposed in a plane closest to the reader, move apart from each other. The same thing happens with respect to the horizontally disposed slats, which are in a plane below the plane of the vertically disposed slats. The edges of these several slats, in any given plane, touch each other and there are hence no openings in this illustrated configuration of FIG. 3. To prevent rotation of the links, it is essential that the pins at the middle of the sides ride in stationary slots 131 orthogonal to their axes. Translational motion of the linkages along their respective longtudinal axes results in a camming action between surfaces 134 and 136, as shown at FIG. 5. This in turn results in a motion of the lens plate 32 towards or away from the plane of slats 101 and accordingly towards or away from emulsion 72 of lensfiche 70. A spring 38 maintains camming services 134 and 136 in abutment. Thus, one motion by the operator of screw 122 performs the dual function of focusing the lenses of lens plate 32 and of varying the relative positions of non-homologous openings 62, 64, etc. Additional camming surfaces (not illustrated) are provided for the link ends adjacent slots 131, so that these ends move in the same manner as the link ends adjacent pins 130. Thus, the plane of the links does not warp when the bolt 122 is rotated.

Figure 6:
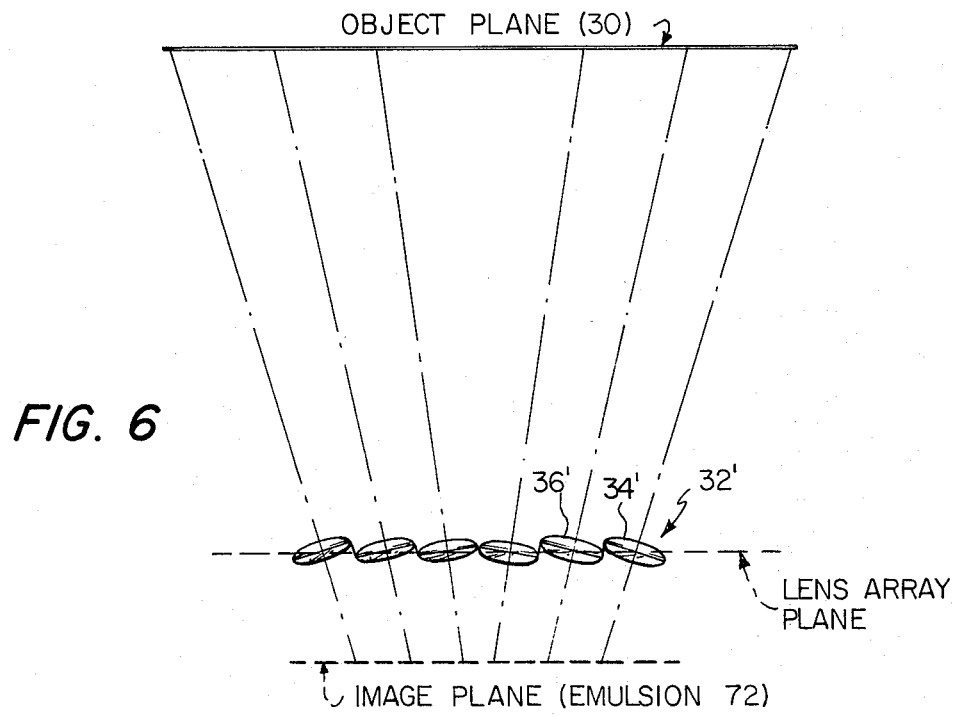

Referring now to FIG. 6 of the drawings, an embodiment is schematically indicated wherein the lens array 32 is provided with individual lenses which are slightly tilted so that the plane of each lens does not coincide with a common plane. Essentially, each of the lenses is tilted slightly off of a central, common axis for the purpose of accommodating wider angles of view, which would be the case when the object is relatively close to the lens array 32. The result of this tilting is to provide paraxial rays for each zone 601–612 of plate 60, so that the quality of the image is also improved. While FIG. 6 discloses only a longitudinal cross-section of such a modified lens array 32, the reader will understand that, measured from the center of the lens array, as one goes away from the center, the lenses lie upon spheres of successively smaller radii. This is shown perhaps most clearly at FIG. 7 of the drawings wherein the innermost lenses, whose centers lie on a straight line, represent the lens array 32 as modified. This innermost lens array may be imagined as having been derived from lenses which were positioned on the surface of a segment of a sphere or cylinder. The reader may easily visualize moving radially inwardly the lenses on the sphere wherein the centers, after such movement, lie on a plane instead of a spherical surface. Even with this geometry, allowing light from the lenses to fall on the lensfiche emulsion may result in some distortion. Accordingly, as indicated at FIG. 8, a plastic sheet 150, as of methyl methacrylate, is positioned in front of mask 60 towards the lens array. Sheet 150 includes integrally molded prisms 152 which bend the light so that when the light from the object for each lens of the array falls upon the emulsion of the lensfiche little, if any, distortion occurs.

Referring now to FIG. 9 of the drawings, an embodiment is illustrated which is capable of use as a motion picture camera. As indicated schematically, the objective lens array is again denoted by numeral 32 and opaque mask 60 is shown behind the lenses and in front of flexible lensfiche 700. This latter element exhibits the same general properties as lensfiche 70 of the previously described embodiment, except that it is flexible and wound around two roll members as indicated. As before, the numeral 79 denotes the viewing screen. The reader will understand that several of the essential elements shown previously have been omitted from FIG. 9 for purposes of clarity of illustration. The general mode of use is the same as previously described.

Referring now to FIG. 10 of the drawings, still another embodiment is illustrated. This embodiment is similar to the embodiment of FIGS. 8 through 15 of my noted co-pending application. In those figures, provision is made for illumination for purposes of readout by means of a plurality of light pipes on a sheet array whose individual light emitting terminii are spaced apart, in one example, on corners of squares of 100 mil sides. The method of fabricating such a sheet is fully described with reference to FIGS. 8–15 of my co-pending application and will not be here repeated. Referring again to FIG. 10 of the drawings, the device, when functioning as a camera, operates in essentially the same manner as previously described. Thus, light from the object passes through the various lenses of lens array 32 and thence passes through apertures 52 of opaque plate 50. Apertures, 86, 88 of plate 81 are entirely similar to openings 62, 64, etc. of plate 60 of the embodiment of FIG. 2. After passing through apertures 84, 86, 88, the light strikes emulsion 72, all as has been previously explained with regard to the other embodiments. The lensfiche 70, after exhaustion of all of the emulsion areas, is now removed from the camera apparatus and developed or fixed and placed back into the apparatus for viewing. The light pipes 82 of plate 81 illuminate the microimages in emulsion 72 in a manner illustrated at FIG. 10. Light is supplied to the light pipes 82 in a manner identical with that described with respect to the embodiment of FIGS. 8–15 of my said co-pending application. Thus, the termini of light pipes 82 may be positioned, for a typical set of parameters, at the corners of squares 100 mils on a side, with the lensfiche 70 being indexed relative to the plate 81 having its illuminated termini for readout of the entire information sets on microfiche 72. Again, septa 80 are employed to preclude overlapping of images on the viewing screen 79. As also described in my said co-pending application, the lensfiche 70 may be provided with inter-lensette opaque portions.

The camera apparatus of this invention may also be employed to record information placed on a transparent screen similar to screen 79, with illumination from the rear. The information passes through the lensettes onto the emulsion. This is the same mode of recording as described in my co-pending application Ser. No. 309,968.

The following examples are given to illustrate typical dimensions and parameters which may be employed in the fabrication of the camera and viewer apparatus system of this invention. These parameters are given in tabular form, with reference to FIGS. 11 and 12 which illustrate the parameters.

I. Typical Parameters for Lens Array 32

1. Nature of large lenses - Simple or Compound
2. Smallest $f^*$ ($f{=}f/D$) $f^* = 3.8$
3. Lens focal length (34) $f = 400$ mils
4. Diameter of Openings (52) = 105 mils
5. Center to center and septa $d = 200$ mils
6. Size of image on zones 601–612 ($\delta \leq d$) $\delta \times \delta = 200$ mils $\times$ 200 mils
7. Openings 62 $h \times h - 4$ mils $\times$ 4 mils
8. Number of lenses 34 N = 50 $\times$ 50 = 2500
9. Lenses looking at an object at infinite distance; $s_1 = $ infinity, $s_1' = f$, and $m_1 = 0$.

II. Typical Parameters of Lensfiche 70 With Magnification $m_2$=50, Associated With Lens Array 32

Lensette Lensetter 76 $f^* = 3.8$

2. Focal length of lensette $(n{=}1.5) f \propto$ thickness = 7 mils
3. Aperture diameter of lensette 76 = 1.8 mil
4. Distance between nearest neighbor images on lensfiche $(d'/50) = 4$ mils 5. Distance between active lensettes = $d'$ $d' = d(1 + m_1) - h = 196$ mils 6. Radius of curvature of lensette 76 R = 2.29 mils
7. Total number of active lensettes for one frame (one macroscene) $N^2 = 2500$ 8. Size of image formed by one lensette on screen $m_2 h \times m_2 h = (4 \times 50) \times (4 \times 50) = 200$ mils $\times$ 200 mils 9. Distances from lensette to viewing screen 79 = 350 mils (through plastic of index 1.5) = 233 mils (through air)
10. Size of viewing area = 10 $\times$ 10 inches 11). Number of frames that can be taken on 10 × 10 inches sheet of film (macroscenes) = $\left(\dfrac{d'}{h}\right)^2 = \left(\dfrac{196}{4}\right)^2 = 2401$

III. SOME CHANGES REQUIRED FOR M=100

1. Size of image produced by one active lensette on screen $m_2 h \times m_2 h = 400$ mils $\times$ 400 mils
2. Nearest neighbor distance for large lenses $d = 400$ mils
3. Distance between active lensettes $d' = 396$ mils
4. Distance from lensette to viewing screen = 700 mils
5. Size of viewing area for $\delta = 200$ mils, 20 $\times$ 20 inches
6. Number of frames that can be taken 99 $\times$ 99 = 9,801

The size of the viewing area in the above example of $m = 100$ can be cut down to, e.g., 4 $\times$ 6 inches by having the size of the image of a large lens reduced to 40 mils $\times$ 60 mils. Hence only N=10$\times$15=150 large lenses and 150 active lensettes need be used. The spacing between large lenses will still be 400 mils and the total number of frames that can be taken on a 4 $\times$ 6 inches film will be 9,801.

For a 30 minute movie with 1,800 seconds with continuous recording equivalent to 10 frames a second, a total of 18,000 frames would be required or roughly 4 $\times$ 12 inches sheet of film will suffice. For 16 discrete frames a second, a total of 28,800 frames, or a roll 4 wide and 18 inches long is called for.

Referring now to FIG. 12b of the drawings, a partial schematic plan view of screen 60 and the edges of septa 56 is indicated. The thick lines represent the thickness of the walls of the individual septa cells 57, 58, etc. and the smaller rectangles correspond to the rectangles 62, 64, etc. of mask 60 through which the subimages are passed. An example will now be given wherein the lens mosaic 32 is not square, but is rectangular and, in this example, is 3 inches by four inches for the image size on screen 79. This example is for the specific case wherein an object is positioned at a fixed distance from the lens mosaic 32. The overall magnification of the system, in this example, is unity.

The following parameters for this specific example are set forth in tabular form.

$d = 0.2$ inches
theta = 15°
total width of lens mosaic 32 = 3 inches
total height of lens mosaic 32 = 4 inches
number of objective lenses 34, 36 = 15 columns $\times$ 20 rows = 300
$D_x' = 2.8$ inches
$D'_y = 3.8$ inches
$m_1 = 1/10$
$m_2 = 10$
focal length $f_1$ of lenses 34 = 600 mils
object distance $s_1$ 32 6.6 inches image distance $s'_1 = 0.66$ inches
$h_x = 0.0423$ inches
$h_y = 0.0367$ inches
$d'_x = 0.178$ inches
$d'_y = 0.183$ inches
number of scenes = 16
The following parameters are for the lensfiche 70:
Thickness $t = 297.5$ mils
Index of refraction $n = 1.586$
radius of curvature $R = 100$ mils
throwing distance in air $= d' = 1.878$ inches
focal length $f = 170.7$ mils
magnification $m_2 = 10$
overall length from lens mosaic 32 rearwards to screen 79 $= 2.836$ in.

Yet another example illustrating a specific embodiment of the invention will be given. $d = 0.2$ inches $m_1 = 0$ and $m_2$ equals 10.
Focal length $f_1$ of objective lenses 34, 36 $= 393.7$ mils
$s_1 -$ infinity
$s'_1 = f_1 = 393.7$ mils $= d = 200$ mils
$h_x = 14.07$ mils $d'_x = d - h_x = 185.93$ mils
$h_y = 10.53$ mils $d'_y = d - h_y = 189.47$ mils
Total number of scenes = 13 columns times 17 rows = 221

The parameters for lensfiche 72 according to this example are as follows:
$m_2 = 10$
radius of curvature $R = 20$ mils
$f = 34.14$ mils
index of refraction $n = 1.586$
thickness $t = 59.5$ mils
throwing distance in air $= d'_1 = 375.6$ inches
Total distance rearward from lens mosaic 32 to screen 79 $= 0.8288$ inches.

The camera apparatus may also be employed to take photographs with film of the type which fixes or develops itself after exposure. An example of this type of film is marketed under the trademark Polaroid. To use such a film, a lensfiche 70 without any emulsion 72 is used. The (fast-developing) unexposed film is placed at the position of the viewing screen 79. The shutter mechanism is actuated, thus exposing the film.

In the embodiment illustrated at FIG. 13, each lens of array 32 is tilted such that its optic axis, instead of passing through the center of its corresponding zone 601–612, passes through the center of its corresponding aperture 62, 64, etc. This also entails a change in the location of aperture stops 52 of plate 50. Reference to FIG. 13 shows that the optic axis of each lens in array 32 passes through the center of an aperture 52, as well as to the center of the several openings 62, 64, etc. of opaque plate 60. Septa 56 prevent overlapping of images on plate 60.

As noted above, the advantage of this embodiment is particularly desirable where inexpensive materials are employed for forming the lenses of array 32. Consider, for example, the differences between FIGS. 2 and 13. The general mode of operation is the same. But in FIG. 2, the optical quality of the image in the middle of any zone 601–612 is the greatest at the center of that zone, because there the image is nearest the optic axis of its corresponding objective lens. However, the corresponding aperture is generally displaced from the center of the zone, such as is the case with zone 601. Accordingly, the optical quality of the partial image passing therethrough as regards distortion, aberrations, and the like is not the maximum. It is clear that if the optic axis of any lens objective is made to coincide with the center of its corresponding opening 62, then the optical quality of the sub-image passing through it would be a maximum.

It will be recalled that in the embodiment of FIG. 2 the images on plate 60 are identical. However, in the embodiment of FIG. 13, images formed on the several zones 601–612 are not, in general, identical. However, the light passing through apertures 62, 64, etc., will have the same general property. That is to say, the sub-images formed on emulsion 72 from the light passing through apertures 62, 64, etc., will exhibit the property of optical coherence. When projected or viewed after the emulsion has been fixed, an optically congruent image will be formed.

The individual lenses 34, 36, etc., of lens mosaic 32 need not be of identical optical properties. For example, the focal length of the lenses can increase with increasing distance to openings 62, 64, etc.

Reference now to FIGS. 14 and 15 will illustrate how the size and positions of apertures 62, 64, etc. in mask 60 are determined. Firstly, for the case of objects at infinity, the several apertures 62, 64 are formed in the manner indicated at FIG. 2 of the drawings. That is to say, aperture 62 is placed in the lower right portion of zone 601, aperture 64 is placed in the right-hand region of zone 602, although higher than corresponding aperture 62. The next zone 603 has its aperture also on the right-hand part of the zone but still higher, while the last zone 604 on the left has its corresponding aperture in the upper right-hand corner. The reader will now be in a position to recognize, after viewing the two columns defined by zones 605–612, that the several apertures are formed in an obvious pattern and such that, in the general case, the sum of the areas of the several apertures 62, 64, etc. is equal to the area of any one of the zones 601–612. In some cases, however, it may be desirable to make the apertures of slightly smaller area so that the sum of the areas would be slightly less than any one of the zones 601–612.

For the case wherein the object is not an infinity, the following considerations determine the location of the apertures 602, 604, etc. on plate 60. The image of each lens in this case is different from all other lens images. The location of the apertures 62, 64, etc. now depends upon the object distance $s_1$ (see FIGS. 13, 14). Moreover, the image distance $s'_1$ varies, i.e., there is no longer a fixed focus distance.

Consider one dimension only (say $y$ direction). Assume N lenses 34, 36, etc. and let H be the height of the object seen by the lenses located a distance $s_1$ away. Each lens must provide 1/Nth of the final image (in the $y$ direction only) and therefore H/N portion of the object must pass through each aperture 62, 64, etc., albeit diminished in size by $m_1 = (s'_1/s_1)$.

Therefore, the height of each opening is given by $$h = m_1 \, H/N = (s'_1/s_1) \cdot H/N = m_1 \, \Delta Y \quad (1)$$

From FIG. 13

$$H = D' + 2s_1 \tan \theta \quad (2)$$

where $\theta$ is the allowed half cone angle for the lenses 34, 36, etc.
Hence, $$h = m_1(D' + 2s_1 \tan \theta) \, 1/N \quad (3)$$

where $$D' = (N-1)d = D-d \qquad (4)$$

Now $h$ must be remagnified by an amount $m_2$ to a height given by $D'/N$, i.e., $$D'/N = m_2h = m_2m_1(D'+2s_1\tan\theta) \qquad (5)$$

or solving for $D'$, $$D' = 2s_1m_2m_1\tan\theta \; \frac{(1)}{1-m_2m_1} \qquad (6)$$

The position of the aperture 62, 64 is now determined as follows. Consider N an even integer. The case N = an odd integer easily follows. Associated with each lens is a portion of the object of an extent given by $$\Delta Y = \frac{D'+2s_1\tan\theta}{N} = \frac{H}{N} \qquad (7)$$

Hence, the area of the object associated with the ith lens is $$Y_{i-1} = (i-1)\frac{D'+2s_1\tan\theta}{N} < Y < i\frac{(D'+2a_1\tan\theta)}{N} = Y_i \qquad (8)$$

$$i = \frac{N}{2}+1...-1,0,1,2,...\frac{N}{2}$$

Knowing the active area of the object assigned to each lens, it becomes relatively easy to calculate the aperture $y$-coordinates on the mask 60.

The determination is indicated by FIG. 14. The solution lies in employing the optic axis of each lens as the reference line. Hence, for the nth lens the position, $y$, of its corresponding aperture on the mask 60 is given by $$\frac{(2n-1)d}{2} - m_1\left(n\Delta Y - \frac{(2n-1)}{2}d\right) \leq y \leq$$
$$\frac{(2n-1)d}{2} - m_1\left((n-1)\Delta Y - \frac{(2n-1)}{2}d\right) \qquad (9)$$

where $\Delta Y$ is given by Eq. (7) and $d$ by Eq. (4)

$d'$ = distance between centers of adjacent apertures,
$= d - m_1(\Delta Y - d) = (1+m_1)d - h$ The quantity $d$ is determined by the manufacturer or lens designer and, in essence, is limited by the maximum cone angle tolerated for aberration. $\Delta Y = H/N$ on the other hand, depends upon $s_1$, shown by Eq. (7). Hence, in addition to focusing the image on the emulsion due to finite distance $s_1$ of the object, it is necessary to change the size and location of the apertures in the scene mask.

The height $h$ of the mask openings is given by Eq. (3) which is included in Eq. (9).

Rewriting $h$, $$h = \frac{m_1}{N}(D' + 2s_1\tan\theta$$

-continued $$= \frac{s_1'}{Ns_1}(D' + 2s_1\tan\theta)$$

$$= \frac{s_1'}{N}\left(\frac{D'}{f_1} + 2\tan\theta\right) - \frac{D'}{N}$$

$$= d\left(1 - \frac{1}{N}\right)\left(\frac{s'}{f_1} - 1\right) + \frac{2s'}{N}\tan\theta \qquad (11)$$

where use is made of the thin lens formula, $$s'_1/s_1 = s'_1/f_1 - 1 \qquad (12)$$

Hence, according to Eq. (11) one changes the height of the aperture linearly with the image distance. This can be done, for example, by the apparatus shown in FIG. 3.

The analysis here presented in the $y$ direction applies also to the $x$-direction and the same formulas obtain. Hence, the problem of size and location of the openings in mask 60 is solved.

In each of the embodiments, spherical lenses may be used as the lenses of array 32. If spherical lenses are employed in the embodiment of FIG. 2, the aperture stops 52 remain located as indicated there. Namely, they are aligned with the center of zones 601–612 and the optic axes of the spherical lenses are hence effectively parallel. If spherical lenses are used in the embodiment of FIGS. 11 and 12, the aperture stops 52 are so positioned that an axis passing from the center of each aperture 62, 64, etc. in mask 60 to the center of its corresponding spherical lens passes through the center of a corresponding opening 52.

The reader will observe that the apparatus of FIG. 2, for example, may be employed as a camera and projector without the requirement of a lensfiche. To carry this out, the exposure is made in the usual manner, onto emulsion 72 (which may or may not be coated to the lensettes 76). After development, light is passed through apertures 78 (screen 79 not being employed) from right to left, with shutters open. The image is reconstituted by objective lenses 34, 36, etc. onto a suitable screen.

It is clear that the apparatus of FIG. 2 can be used as a telescope wherein between mask 77 and sceen 79 is located an image intensifier of a conventional and known type.

An embodiment is illustrated at FIG. 16 which will yield color pictures while employing black and white emulsion. Three lensettes of lensfiche 70 are illustrated and correspond to any three adjacent and aligned apertures in mask 60, and are here denoted as 62′, 62 and 64. Color filters denoted by R, B, G, corresponding to the colors red, blue and green, respectively, are mounted within each opening 62′, 62 and 64. It is seen that each color filter extends over one-third of its corresponding opening. In lieu of septa 80, septa 81 of lesser height than 80 are illustrated. The operation of this embodiment is as follows. For the taking or recording stage, the operation is identical to that previously described, namely, the shutter mechanism is actuated for each exposure and thereafter the lensfiche 70 indexed one unit in readiness for the next exposure. As some of the sub-images of the entire scene pass through the several openings 62', 62, 64, the color filters either pass or block out certain wavelengths, as is well known in the art. Thus, immmediately next to the blue filters, microimages will be formed in emulsion 72 of the lensfiche. The same will hold true for those areas immediately adjacent and aligned with the red and the green filters. At the conclusion of the taking process, when all emulsion areas of the lensfiche have been exhausted, the lensfiche is removed and developed as by the well known reverse-development process.

The projection or readout operation takes place as follows. White light is placed on the other side of mask 60 and shines towards the lensfiche and viewing screen 79. The reader will observe that the optic axis of each lensette 76 coincides with a red filter and the micro image in emulsion 72 immediately adjacent the red filter. The projection from the middle red filter portions is straight along the optic axis of each lensette 76 and fills a first or middle area on projection screen 79. This happens for each of the active lensettes along its respective optic axis. Accordingly, the so-to-speak red microimages are projected straight ahead onto the screen 79.

However, a different action occurs with the blue microimages. By virtue of the curvature of the lensettes 76, each microimage in emulsion 72 which corresponds to a blue filter will now pass in a direction from the upper right to the lower left of FIG. 16 upon projection. Thus, the microimage associated with the blue filter in opening 62' will, upon development and projection, be superimposed upon the red projected microimage on screen 79 corresponding to opening 62.

A similar action occurs with the microimages associated with the green filter of each opening in mask 60. These microimages will pass in a direction from the upper left to the lower right of FIG. 16 upon projection. Thus, the microimages associated with the green filter at opening 64 will be superimposed upon the red projected microimage of opening 62 and the blue projected microimage associated with opening 62'. Thus, each area of screen 79 will receive the projection of 3 overlapping microimages. The first will be the microimage from the central color filter R, and the second and third will be the microimages from the other two color filters immediately adjacent. In order to inhibit any further overlapping, septa 81 confine the maximum projection angle such that no red or green images pass to a part of screen more remote than one cell laterally.

Referring now to FIG. 17 of the drawings, a modification is illustrated which inhibits utility as a motion picture camera and viewer. While exhibiting some similarity to the embodiment of FIG. 9, it is substantially different. As before, the numeral 32 denotes an array of relatively large objective lenses similar to that previously described. The numeral 70a denotes a flexible lensfiche in the form of a continuous loop. All portions of the lensfiche contain the emulsion, the central body of the lensfiche, and integral lensettes on the body side opposite the emulsion. The lensfiche, in a typical example, has a thickness of approximately 4 mils. The numeral 60 again denotes a mask having staggered (non-homologous) openings 62, 64, etc. as in the embodiments of FIGS. 1 and 2. A screen 79a is positioned at the rear of the device, while a spring motor, not illustrated, turns roller elements 204 and 206 in the indicated direction. A single fixer-and-developer is schematically denoted by the numeral 202 and is of a known chemical composition and in the general form indicated. The operation of the device is as follows. The spring motor is actuated and the rollers 204, 206 rotate in the indicated direction. As the front or left run of the flexible lensfiche 79a moves downwardly, it is first optically exposed and thereafter chemically fixed by element 202. This process continues until all of the emulsion areas have been exhausted. As known to workers in this art, it is sufficient that the lensfiche 79a run in a single direction only, by suitably staggering the openings 62, 64, etc. of mask 60. After such exhaustion of emulsion areas, the fixture and developer 202 is withdrawn from the apparatus and disclosed, the belt 70a is turned inside out and now is in a position or configuration to be used as a projector or viewer, with congruent moving pictures being viewed on the screen 79a by the viewer.

What is claimed is:

1. A combination projector and camera projection apparatus including,
   a. a generally planar array of objective lenses,
   b. an opaque scene mask, said mask being at a distance from said lenses equal to the image distance of said lenses,
   c. septa extending from said objective lenses to said scene mask, said septa defining cells, the septa forming with their intersection with said scene mask a plurality of identical zones on said scene mask, each zone corresponding to a single lens of the array,
   d. said scene mask having apertures, there being an aperture for and corresponding to each of said objective lenses and to each of said zones, the optic axis of each objective lens intersecting a corresponding, single one of said zones on said scene mask, the apertures of said scene mask being non-homologously positioned with respect to the said zones of the scene mask so that no two apertures of said scene mask have the same homologous position in their respective zones.

2. The apparatus of claim 1 wherein the intersection of the optic axis of each objective lens with its corresponding zone on said scene mask is at the center of the zone.

3. The apparatus of claim 1 wherein the intersection of the optic axis of each objective lens with its corresponding zone on said scene mask is at the center of the said aperture corresponding to and positioned within each zone.

4. The apparatus of claim 1 including,
   a. a lensfiche having a photographic emulsion on one side thereof and a plurality of integral lensettes on the other side thereof, opaque portions extending around said lensettes to form aperture stops for said lensettes, said lensfiche being parallel to and contiguous to said scene mask, said scene mask positioned between said lensfiche and said lens array,
   b. a second opaque mask overlying and parallel to said lensettes, said second mask having openings, said openings being larger than the said lensette aperture stops, there being a corresponding second mask opening for each said lens of said objective lens array, c. a light-scattering viewing screen parallel to and spaced from said lensfiche a distance equal to the image distance of said lensettes.

5. The apparatus of claim 1 wherein the optic axes of said objective lenses are parallel.

6. The apparatus of claim 1 wherein the optic axes of said objective lenses diverge from an imaginary point on the same side of the lenses as said septa.

7. The apparatus of claim 6 wherein the centers of said lenses lie on a common plane.

8. The apparatus of claim 6 including a light refracting prism covering each opening of said scene mask and being on the side thereof adjacent said septa.

* * * * *